Patented Sept. 22, 1925.

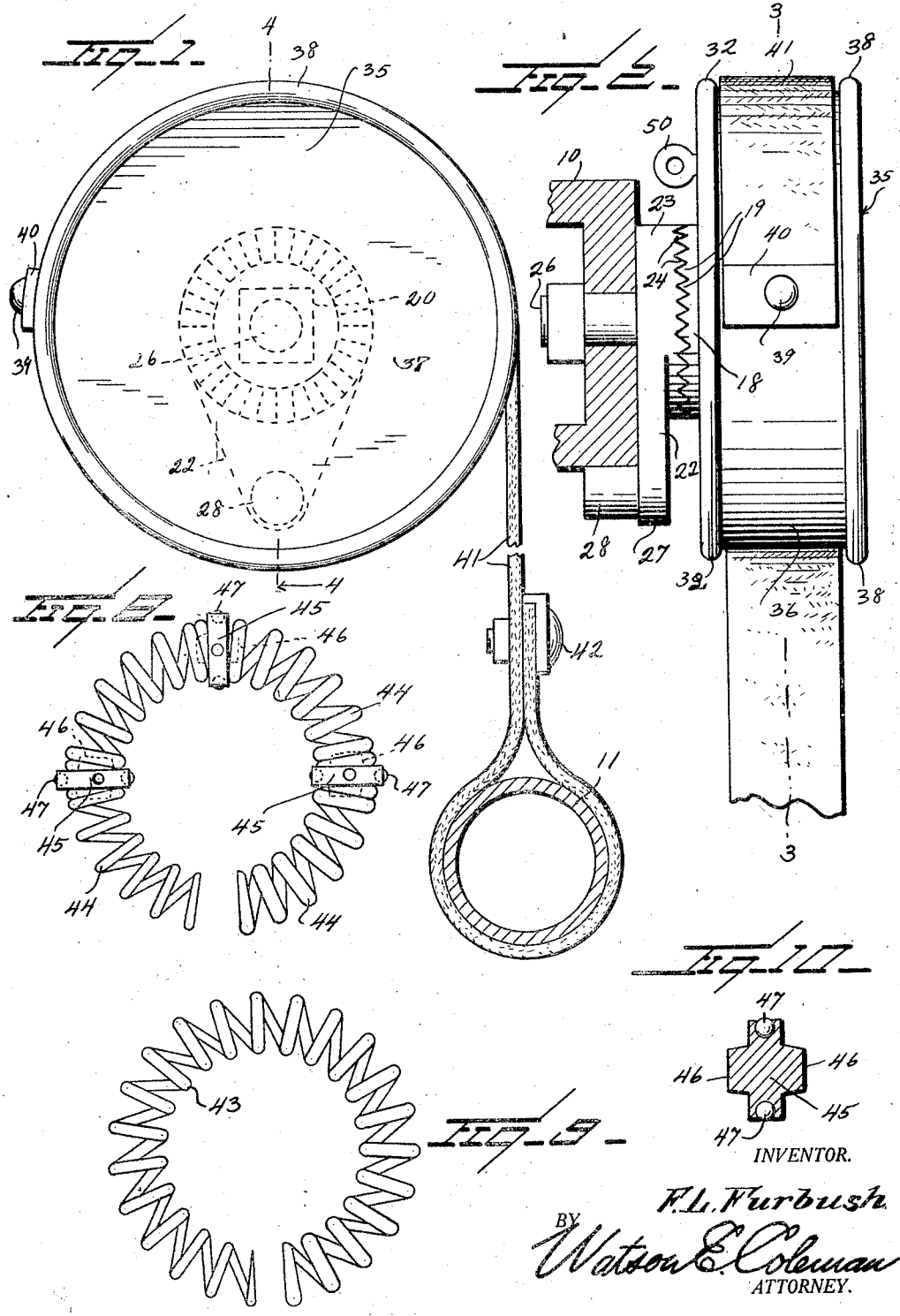

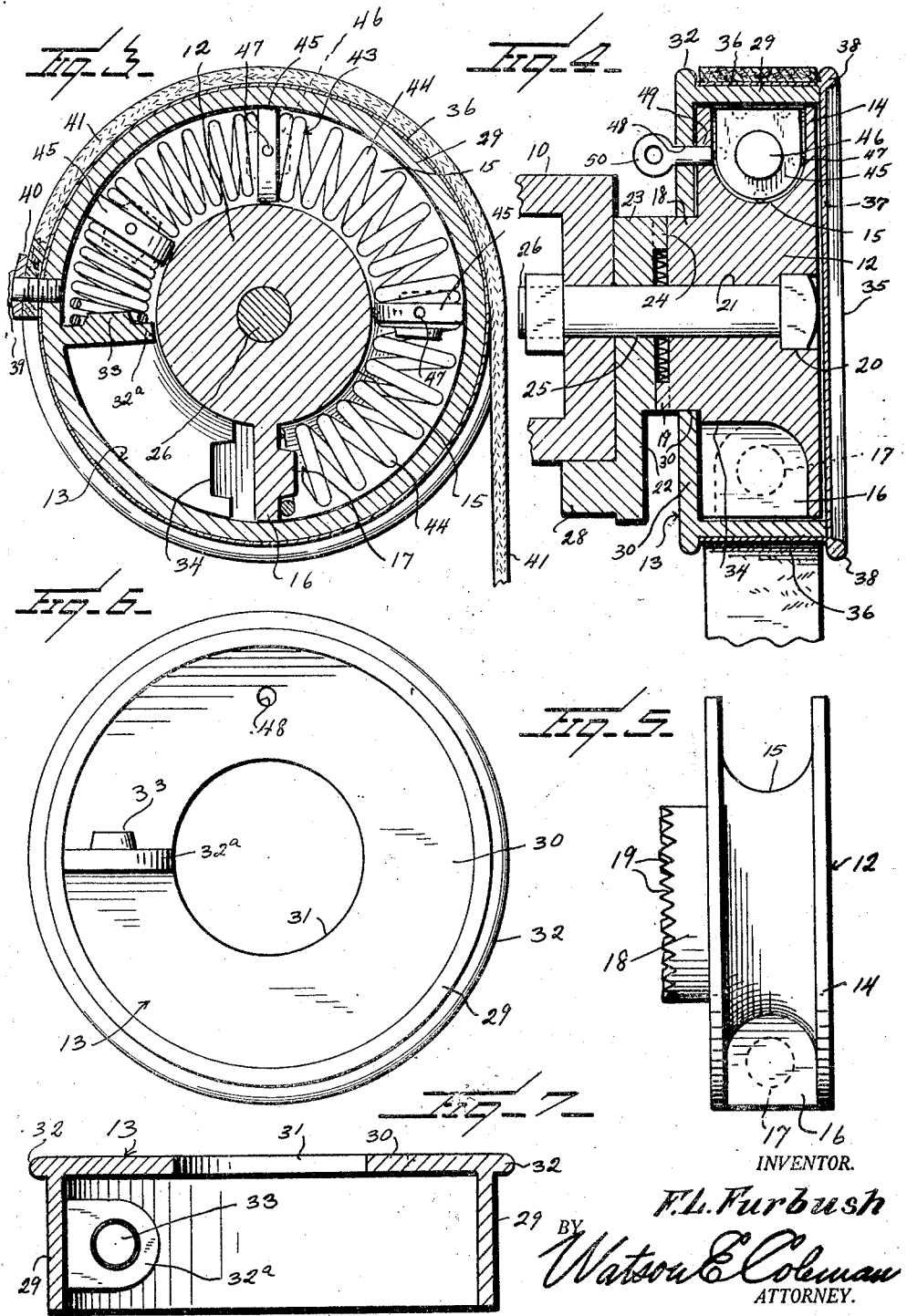

1,554,912

UNITED STATES PATENT OFFICE.

FRANK L. FURBUSH, OF GRANITEVILLE, MASSACHUSETTS.

SNUBBER.

Application filed November 7, 1923. Serial No. 673,313.

*To all whom it may concern:*

Be it known that I, FRANK L. FURBUSH, a citizen of the United States, residing at Graniteville, in the county of Middlesex and State of Massachusetts, have invented certain new and useful Improvements in Snubbers, of which the following is a specification, reference being had to the accompanying drawings.

This invention relates to snubbers or recoil shock absorbers.

An important object of the invention is to provide a simple and efficient snubber of the strap and pulley type including means resisting the rotation of the pulley so constructed that a greater proportion of resistance to the rotation of the pulley is afforded.

A further object of the invention is to provide a device of this character which is readily assembled and attached to the vehicle and which has means for holding the shock absorbing spring thereof partially compressed during application of the device to the vehicle.

A further object of the invention is to provide a novel and improved spring mounting for snubbers or shock absorbers of this type.

A still further object of the invention is to provide a device of this character which is simple in its construction and operation, which will be durable and efficient as well as economical in operation and which may be very cheaply produced.

These and other objects I attain by the construction shown in the accompanying drawings, wherein for the purpose of illustration is shown a preferred embodiment of my invention and wherein:—

Figure 1 is a side elevation of a snubber constructed in accordance with my invention;

Figure 2 is an edge elevation thereof;

Figure 3 is a section on the line 3—3 of Figure 2;

Figure 4 is a section on the line 4—4 of Figure 1;

Figure 5 is an edge elevation of the stationary member;

Figure 6 is a side elevation of the drum, the cover being removed;

Figure 7 is a transverse sectional view through the drum;

Figure 8 is a view showing the preferred form of spring employed;

Figure 9 shows a modified form of spring; and

Figure 10 is a sectional view through one of the separators employed.

Referring now more particularly to the drawings, the numeral 10 indicates a vehicle chassis frame and 11 the axle of the chassis. The snubber embodies an inner stationary member 12 and an outer rotatable member 13, the latter being connected to the axle 11 in such a manner that it is rotated upon movement of the axle toward or away from the frame 10 as will hereinafter be more fully set forth.

The inner stationary member comprises a disk 14 having in its periphery a groove 15 interrupted at one point by a stop member 16 completely filling the groove and having one flat side directed radially of the disk and provided upon its opposite side with an outstanding lug 17. The groove 15 preferably has an arcuate base and the lug 17 is preferably circular with the center of curvature of this base as a center. The disk is provided at one side thereof with a hub 18 formed with radially extending teeth 19. At the opposite face of the disk from the hub the disk is formed with a poly-angular socket 20 having a seat for the head of a bolt, the shank of which is directed through an axle bore 21 extending through the disk and hub.

Associated with the disk is a dog 22 having a hub portion 23 corresponding to the hub portion of the stationary member 12 and having teeth 24 coacting with the teeth 19 thereof. This hub portion 23 is further provided with a bore 25 through which the shank of the bolt 26, having its head seated in the socket 20, may extend for engagement through the frame member 10 of the vehicle. The dog 22 further embodies an arm 27 extending rearwardly from the hub and having at its end an angular lug 28 directed toward and adapted for engagement with the frame member 10 to prevent rotation of the dog with the bolt 26 as a center. It will be seen that the disk 22 may be rotatably adjusted with respect to the dog and may be permanently secured in such adjusted position by tightening of the bolt 26.

The outer rotatable member 13 comprises a drum having circular side walls 29 and an end wall 30 formed with an opening 31 of a size rotatably receiving the hub 18 of the disk 14. In alignment with this end wall 30 the circular side wall 29 is provided with an outstanding rim or bead 32 for a purpose presently to appear. Projecting inwardly from the side wall 29 is a lug 32$^a$ having one side face thereof smooth and radial to the drum and the opposite side face thereof provided with a centering lug 33 similar to the centering lug 17 of the lug 16 of the disk. The side wall of the disk upon which the hub is formed is provided with a slot 34 entirely through this wall and permitting insertion of the lug 32 and its centering lug 33 through such side wall so that the lug 32$^a$ is disposed within the groove 15 of the disk 14. The outer rotatable member 13 further includes a cap 35 for the drum having relatively thin side walls 36 having a sliding fit over the outer surface of the side walls 29. This drum cover is provided in alignment with its end wall 37 with an outstanding bead or flange 38. The cover is held in position upon the drum by a securing element 39 which is threaded in the wall 29 of the drum and is directed through a clamping plate 40, a strip of webbing 41 and the wall 36 of the cover in the order named, the clamping plate holding the webbing firmly against the outer surface of the drum cover. This webbing is guided by the rims or flanges 32 and 38 and has its end portion passed about the axle 11 and clamped upon itself as indicated at 42, although any suitable means of attaching the webbing to the axle may be resorted to.

Disposed within the groove 15 of the inner stationary member 12 is a spring 43 having one end thereof centered by the centering lug 17 and the opposite end thereof centered by the centering lug 33. In Figure 8 I have illustrated the spring 43 as consisting of a single length of material which is tapered from end to end and then coiled to form a spring. The spring is preferably, however, formed in a plurality of sections 44, each succeeding section being of greater strength than the preceding section. A spring of this character is more easily produced than that spring hereinbefore described. With a spring of the latter construction I prefer to provide separators 45, each consisting of a piece of material conforming in shape to the groove and provided upon opposite sides thereof with centering lugs 46 adapted for engagement in the interior of the coil of the spring. The periphery of the piece of material has mounted therein anti-friction elements 47, the faces of which project beyond the faces of the piece of material for engagement with the walls of the groove and the inner wall of the drum thereby preventing undue friction of either the springs or the separators with the walls of the drum and with the walls of the groove.

In application of a snubber of this character it is desirable that the spring be partially compressed before the device is attached to the vehicle so that upon a slight movement of the chassis frame toward the axle the spring does not come into operation and so that during movements of the chassis frame toward the axle the webbing 41 will not slack off. In the ordinary construction in order to produce this desired compression of the spring it is necessary that the rotatable drum be rotated after application of the assembly to the frame. In accordance with my invention I form in the wall 30 of the drum an opening 48 and in the adjacent face of the disk 14 a corresponding socket 49. A pin 50 is provided which is insertible through the opening of the drum into this socket when these parts have been relatively rotated to compress the spring 43 the desired amount. This pin is left in position until the device is applied to the vehicle and is then removed, releasing the spring so that it may place its strain against the webbing. From the foregoing it is believed to be obvious that a shock absorber constructed in accordance with my invention may be readily produced and as readily applied to the vehicle. It will furthermore be obvious that the construction of the shock absorber is such that it has a greater flexibility of operation than those shock absorbers embodying a single uniform spring. Many changes being possible in the construction of the device as hereinbefore set forth without in any manner departing from the spirit of my invention, I do not wish to be understood as limiting myself to such specific structure except as hereinafter claimed.

I claim:—

1. In a snubber, a stationary member and a member rotatable upon the stationary member, coacting stop portions upon said members limiting relative rotation thereof in one direction, a spring associated with the members and tending to force said stop members into engagement one with the other, and removable means engageable with both of said members for holding the members in relative positions where the spring is partially compressed.

2. In a snubber, a stationary member and a member rotatable upon the stationary member, coacting stop portions upon said members limiting relative rotation thereof in one direction, a spring associated with the members and tending to force said stop members into engagement one with the other, and means engageable with both of said members for holding the members in relative positions where the spring is partially compressed during application of the snubber to the vehicle, said means being removable after application of the snubber to thereby place the strain of the spring against said rotatable member.

3. In a snubber, a disk provided in its periphery with a groove, the disk having a hub, a drum rotatable upon the hub, a stop member carried by the disk and interrupting the groove, a similar stop member carried by the drum and extending into the groove, a spring disposed within said groove and having its ends abutting remote faces of said stop members, said spring consisting of a plurality of sections, and separators disposed between said sections and slidable in the grooves having upon opposite faces thereof centering lugs for engagement in the ends of adjacent spring sections, the peripheral walls of said separators having anti-friction elements engaging the walls of the groove and drum.

4. In a snubber, a stationary member and a member rotatable upon the stationary member, coacting stop portions upon said members limiting relative rotation thereof in one direction, a spring associated with the members and tending to force said stop members into engagement one with the other, and means engageable with both of said members for holding the members in relative positions where the spring is partially compressed during application of the snubber to the vehicle, said means being removable after application of the snubber to thereby place the strain of the spring against said rotatable member, said rotatable and stationary members being engageable by relative movement thereof upon the aligned axis of the members, the stationary member having a groove in which the spring is housed, the wall of the groove being provided with a notch permitting movement of the stop member of the rotatable member into said groove.

In testimony whereof I hereunto affix my signature.

FRANK L. FURBUSH.